United States Patent [19]
Dunn

[11] 3,823,484
[45] July 16, 1974

[54] MULTI-PROBE HOLE-LOCATION AND CONCENTRICITY-MEASURING SPINDLE FOR DIAL INDICATOR GAUGE

[75] Inventor: Garf L. Dunn, Farmington, Mich.
[73] Assignee: Dunn Tool Company, Livonia, Mich.
[22] Filed: Aug. 28, 1972
[21] Appl. No.: 284,407

[52] U.S. Cl. ............................. 33/174 Q, 33/172 D
[51] Int. Cl. ........................... G01b 5/00, G01b 5/24
[58] Field of Search ........... 33/174 Q, 172 R, 172 D

[56] References Cited
UNITED STATES PATENTS
3,732,624   5/1973   Eisele .............................. 33/174 Q

*Primary Examiner*—William D. Martin, Jr.
*Assistant Examiner*—Willis Little

[57] ABSTRACT

An elongated hollow stepped probe-supporting shaft is adapted to be operatively connected to a conventional dial indicator and has four stepped portions of successively increasing diameters, the largest of which is a cylindrical pilot portion adapted to be mounted in a master fixture. The three remaining stepped cylindrical portions of successively increasing diameters are provided with axially-spaced parallel transverse bores containing three reciprocable hole-location probes. Each such probe is notched to provide a motion-transmitting contact edge. The probe-supporting shaft contains an elongated reciprocable and rotatable motion-transmitting rod provided with three circumferentially-spaced cam portions inclined relatively to one another and rotatable to selectively engage the contact edge of each probe in succession while the other two cam portions are temporarily held out of contact with the contact edges of the other two probes.

2 Claims, 13 Drawing Figures

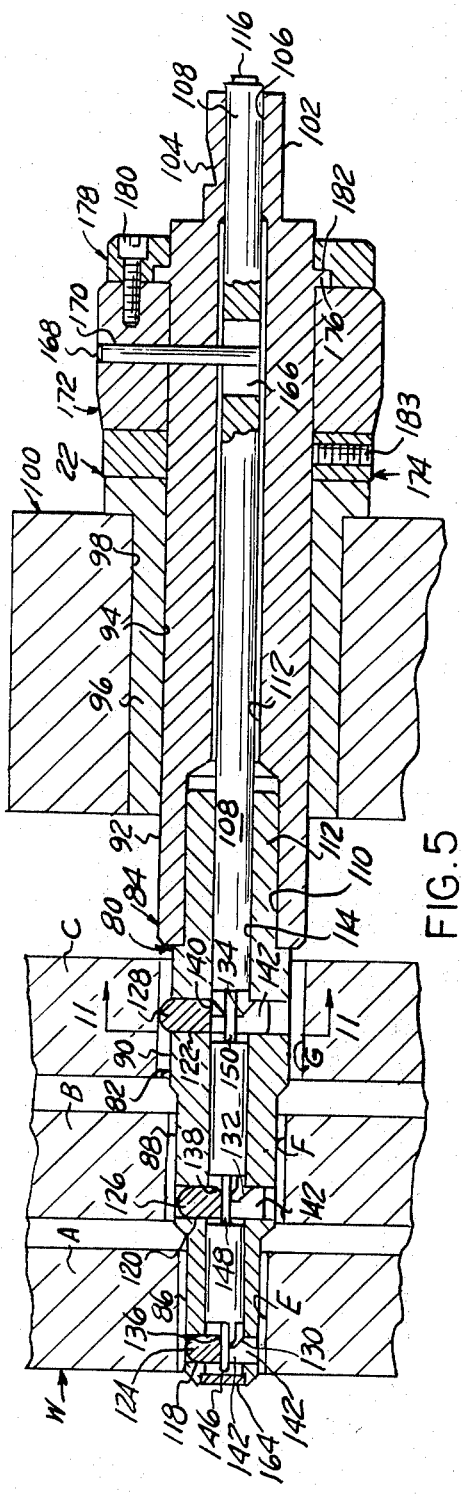
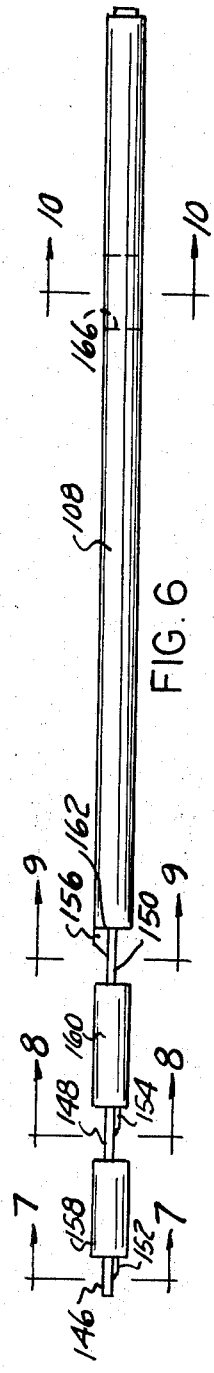
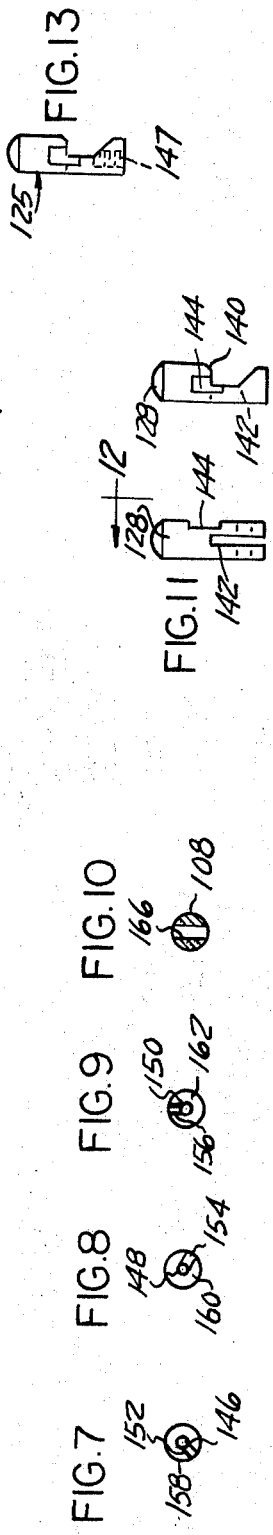
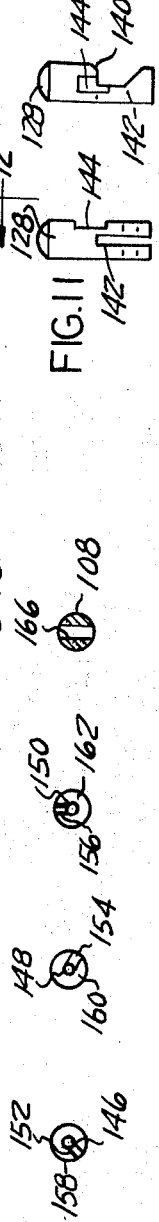
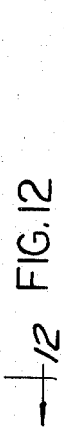

MULTI-PROBE HOLE-LOCATION AND CONCENTRICITY-MEASURING SPINDLE FOR DIAL INDICATOR GAUGE

SUMMARY OF THE INVENTION

Near its rearward end, the motion-transmitting rod is slotted to receive an operating pin, the outer end of which is seated in an indexing ring by which the motion-transmitting rod can be rotated selectively. This ring is provided with a yieldable detent adapted to register with three detent notches corresponding to the three circumferentially-spaced locations of the cam portions on the motion-transmitting rod. By this mechanism the motion-transmitting rod is rotated smoothly and positively into each of its three probe-selecting portions. If more than three such stepped bores are to be so measured, a corresponding number of such probes and cam portions are provided in the above manner.

In the drawing,

FIG. 5 is a central vertical longitudinal section through the spindle, removed from the dial indicator holder, in position for successively measuring third, second and first workpiece bores or holes;

FIG. 6 is a side elevation of the motion-transmitting rod of FIG. 5, removed from the spindle;

FIGS. 7, 8, 9 and 10 are cross-sections, taken along the lines 7—7, 8—8, 9—9 and 10—10 respectively in FIG. 6;

FIG. 11 is a front elevation of the third probe shown in FIG. 5, looking in the direction of the arrows 11—11 therein;

FIG. 12 is a side elevation of the third probe shown in FIG. 11, looking in the direction of the arrows 12—12 therein; and FIG. 13 is a view similar to FIG. 12, but showing a slightly modified third probe.

Figure 1:
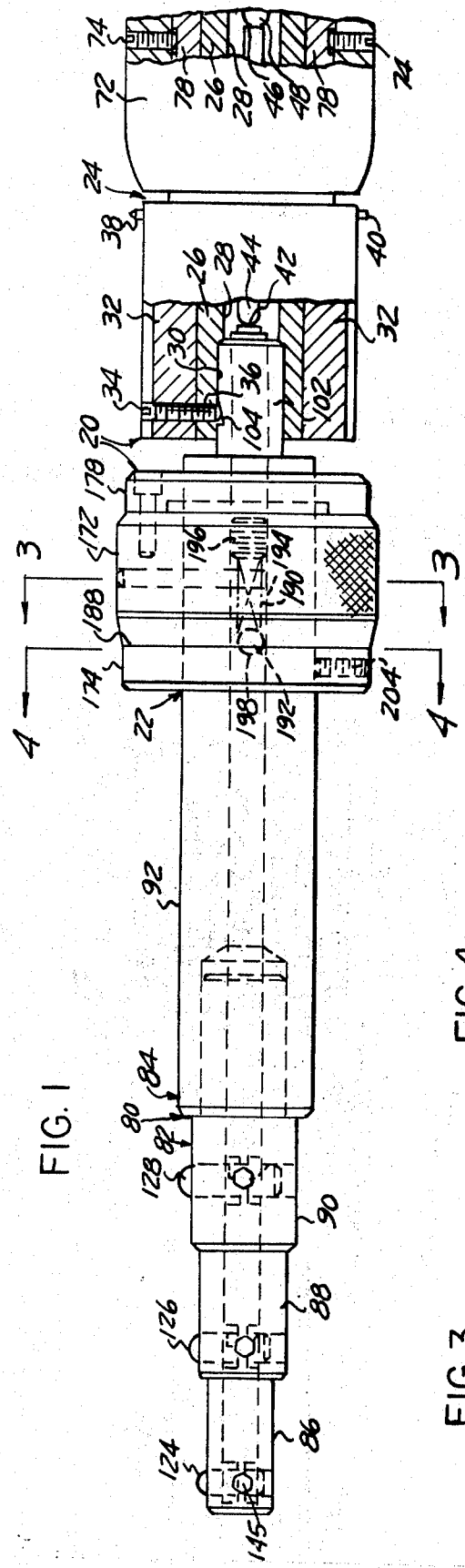
FIG. 1 is a side elevation, partly in central longitudinal section, through a multi-probe hole-location and concentricity-measuring spindle mounted in the socket of a conventional relatively-rotatable dial indicator holder, according to one form of the invention, with the third probe activated and the first and second probes deactivated.
Figure 2:
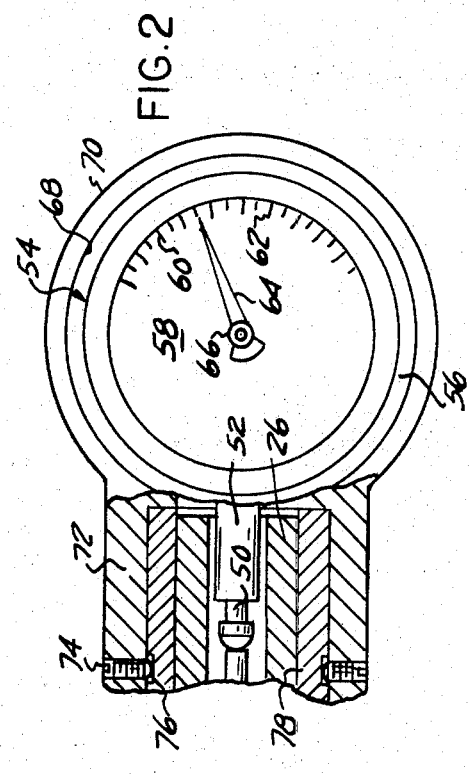
FIG. 2 is a fragmentary top plan view, partly in central horizontal section, of the rearward end of the spindle of FIG. 1 and the dial indicator in its holder.

Referring to the drawings in detail, FIGS. 1 and 2 show a multi-probe hole-location and concentricity-measuring gauge, generally designated 20, according to one form of the invention, as consisting generally of a multi-probe hole-location and concentricity measuring spindle 22 furnished in various sizes and adapted to be interchangeably inserted on a conventional relatively rotatable dial indicator holder 24. The latter includes an elongated tubular support 26 having a bore 28 therein which terminates at its forward end in a counterbore or chuck socket 30 adapted to receive the interchangeable measuring spindle 22 of various sizes as described more fully below. Mounted in telescoped relationship upon the forward end of the tubular support 26 is a longitudinally fluted rotary handle 32 in the form of a sleeve which is drilled and threaded near its forward end to receive a set screw 34. The inner end of the latter passes through a clearance hole 36 into the socket 30. The rearward end of the rotary handle 32 is drilled in alignment with the set screw 34 to snugly and fixedly receive a pointer 38 which indicates to the operator the corresponding point within the workpiece bore and counterbore where probe contact is being made at any particular instant. Diametrically opposite the pointer 38, the rotary handle 32 is drilled to similarly snugly receive a blunt-ended pin 40 which shows to the operator the point in the workpiece bore or counterbore diametrically opposite the above-mentioned probe contact point therewith.

Slidably mounted within the tubular support 26 and projecting into the counterbore 28 is the rounded forward end 42 of a forwardly spring-pressed auxiliary motion-transmitting rod 44. The rearward end 46 of the auxiliary motion-transmitting rod 44 engages a hemispherical contact button 48 on the outer end of a dial indicator plunger 50 reciprocably mounted in the tubular stem 52 of a conventional dial indicator, generally designated 54. The latter has a casing 56 (FIG. 2) containing a dial 58 provided with a graduated circular scale 60 having graduations 62 in customary dimensional units of measurement, such as thousandths or ten-thousandths of an inch. Registering with the graduations 62 on the scale 60 is a dial indicator needle 64 mounted on a rotary needle shaft 66 connected by a motion-multiplying mechanism (not shown) to the dial indicator plunger 50.

The dial indicator 54 is mounted in the cup-shaped recess 68 of a dial indicator housing 70 having a stationary tubular handle boss 72. The latter is drilled and threaded to receive a pair of set screws 74 by which it is secured to flat spots 76 upon a sleeve 78 which in turn is mounted on the relatively-rotatable tubular support 26 in telescoped relationship thereto. In this manner, the tubular support 26 is rotatably mounted within the sleeve 78 so that the dial indicator holder 24 can be held stationary with one hand grasping the tubular handle boss 72 while the other hand grasps and turns the rotary handle 32.

The measuring spindle 22 (FIGS. 1 and 5) includes an elongated composite hollow probe-supporting structure or shaft 80 made up, for convenience of manufacture, of separate forward and rearward components 82 and 84. The forward component 82 has first, second and third portions 86, 88 and 90 respectively of successively increasing diameters. The rearward component 84 of largest diameter is of generally cylindrical form and has an external cylindrical pilot surface 92 which is adapted to snugly but rotatably fit a reference surface 94 in a flanged hardened steel bearing bushing 96 seated in a bore 98 in a stationary master fixture, generally designated 100.

The master fixture 100 is fixedly mounted in a stationary position in a manner (not shown) well known to those skilled in the mechanical manufacturing industries, but beyond the scope of the present invention, for holding, in registry with the reference surface 94 of the master fixture 100, a workpiece W. The latter may be assumed to have walls or partitions A, B and C containing first, second and third bores E, F and G respectively of successively increasing diameters intended to be so machined at predetermined locations relatively to one another and to the reference surface 94 in the master fixture 100. It may be assumed, for example, that the workpiece bores E, F and G are intended to be coaxial with one another and with the reference surface 94, or, as more commonly stated in such industries, "concentric" with one another.

The rearward shaft portion 84 is provided at its rearward end with a reduced-diameter hollow shank 102 adapted to snugly but removably and interchangeably fit the counterbore 30 (FIG. 1) in telescoping relationship therewith, and to be removably held therein by the set screw 34 engaging an inclined flat-bottomed notch 104 in the shank 102. The rearward shaft portion 84 is provided with a rearward bearing bore 106 within which the rearward end portion of a main motion-transmitting rod 108 is both reciprocably and rotatably mounted. While the forward and rearward components 82 and 84 of the composite stepped shaft 80 are made separate from one another for convenience of manufacture, it will be understood that they may be made integral with one another if so desired. As shown in composite form, the forward end of the rearward shaft portion 84 is provided with a counterbore 110 in a longitudinal bore 112 coaxial with the cylindrical pilot surface 92 and rearward bearing bore 106. Snugly and securely fitted into the forward counterbore 110 is the reduced diameter stem portion 112 of the forward shaft portion 82 which in turn is provided with a forward bearing bore 114 coaxial with the rearward bearing bore 106 and also reciprocably and rotatably receiving the forward portion of the main motion-transmitting rod 108.

The main motion-transmitting rod 108 is provided with a reduced diameter flat rearward end 116 engageable with the rounded forward end 42 of the auxiliary motion-transmitting rod 44 (FIG. 1) for imparting reciprocatory motion thereto. The first, second and third portions 86, 88 and 90 respectively of the forward shaft component 82 (FIG. 5) are provided with transverse bores 118, 120 and 122 respectively intersecting the longitudinal bore 114 and inclined slightly to the longitudinal axis thereof. Reciprocably mounted in the bores 118, 120 and 122 are round-ended first, second and third probes 124, 126 and 128 respectively, these being transversely notched at 130, 132 and 134 respectively to provide 45° beveled contact edges 136, 138 and 140 respectively. The probes 124, 126 and 128 are slotted axially at 142, and flattened at 144 and the forward shaft component 82 drilled and threaded transversely to receive retaining set screws 145 (FIG. 1), which also prevent rotation of the probes. The modified probe 125 shown in FIG. 13 is drilled and threaded at its lower end to receive a headless retaining set screw 147.

Extending through the slots 142 are reduced diameter neck portions 146, 148 and 150 respectively of the main motion-transmitting rod 108, and extending radially outward from such neck portions are inclined segmental cam portions 152, 154 and 156 respectively disposed at circumferentially spaced intervals around the neck portions 146, 148 and 150 respectively (FIG. 6). As shown in FIGS. 7, 8 and 9 respectively, the first, second and third cam portions 152, 154 and 156 are spaced circumferentially from one another. From FIGS. 7, 8 and 9 it will be seen that the inclined cam portions 152, 154 and 156 occupy but narrow sectors of the main motion-transmitting rod 108, the remainder around the necks 146, 148 and 150 being cut away to provide circumferential clearances 158, 160 and 162 respectively.

The forward end of the bore 144 is counterbored, threaded and closed by a screw closure plug 164 (FIG. 5). Near its rearward end the main motion-transmitting rod 108 is provided with an elongated diametral slot 166 (FIGS. 5 and 10). Projecting into the slot 166 is the inner end of an elongated pin 168 of substantially the same diameter as the width of the slot 166 with sufficient clearance to enable sliding engagement therebetween. The outer end of the pin 168 is seated in a radial bore 170 in an index ring or probe selector 172 which is rotatably mounted on the pilot portion 84 of the composite hollow shaft 80 and held in its fixed axial position thereon between an index disc or probe locator carrier 174 and an annular rib 176 on the rearward shaft portion 84 near the rearward end thereof (FIG. 5). A retainer disc 178 and the index ring 172 are drilled and threaded in alignment with one another at circumferentially spaced locations (only one of which is shown in FIG. 5) to receive screws 180. The retainer disc 178, the index ring 172 and the index plate 174 are bored in alignment with one another to snugly receive the pilot surface 92, and the retainer disc 178 is counterbored at 182 to engage the annular rib 176. The index plate 174 is drilled and threaded radially to receive a set screw 183 by which it is fixedly secured to the rearward component 84 of the probe-supporting shaft 80.

Figure 3:
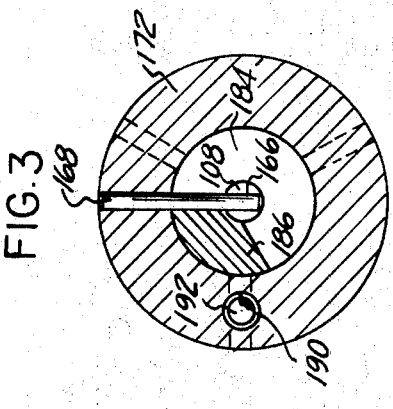
FIG. 3 is a cross-section, taken along the line 3—3 in FIG. 1.

The rearward component 84 of the hollow probe-supporting shaft 80 in line with the pin 168 is cut away or provided with a sector-shaped cavity 184 (FIG. 3) having a width sufficient to permit free passage of the pin 168 in the approximately 120 degree swing thereof during operation, leaving a sector portion 186, the opposite sides of which serve as stops which limit the swing of the pin 168. Extending into the forward face 188 of the index ring 172 is a bore 190 having a restricted forward end against which a detent ball 192 (FIG. 1) is urged by a compression spring 194. The rearward end of the bore 190 is threaded and closed by a threaded screw plug 196 which also serves as an abutment for the compression spring 194.

Figure 4:
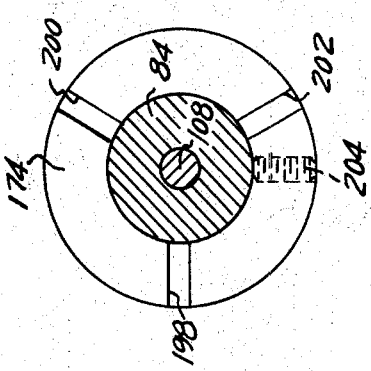
FIG. 4 is a cross-section, taken along the line 4—4 in FIG. 1.

The spring 194 urges the detent ball 192 forward into indexing engagement with any selected one of three radial detent V-grooves or probe locators 198, 200 or 202 (FIG. 4) spaced circumferentially apart from one another (but not necessarily equally spaced) in the rearward face of the index plate or disc 174. The latter is fixedly secured to the rearward component 84 of the hollow shaft 80 by being drilled and threaded radially to receive a headless set screw 204. The detent grooves 198, 200 and 202 are so located as to activate, at one time, one only of the three probes 124, 126 and 128. If additional probes are provided, additional detent grooves are also provided, one for each such probe. To activate the third probe 128, for example, (FIGS. 1, 3 and 5) this is done by moving the cam portion 134 of the main motion-transmitting rod 108 into alignment with the contact edge 140 of the third probe 128 while rotating the clearance notches or cutaway portions 160 and 158 adjacent the contact edges 138 and 136 of the second and first probes 126 and 124. Rotation of the index ring 172 to move the detent ball 192 clockwise selectively into the detent notches 200 or 202 (FIG. 4) in a similar manner de-activates the third probe 128 and activates either the second probe 126 or the first probe 124 while de-activating the first probe or the second probe 126 respectively.

In the operation of the multi-probe hole-location and concentricity-measuring spindle 22, let it be assumed that the appropriate spindle 22 for the particular measuring task has been selected and that its reduced diameter hollow shank 102 has been inserted in the socket 30 and locked in position by tightening the set screw 34 so that its lower end firmly engages the inclined flat-bottomed notch 104 in the hollow shank 102. The operator then inserts the hollow shaft 80 through the pilot bore 94 in the bearing bushing 96 in the master fixture 100 so that the forward shaft component 82 passes into the workpiece W a sufficient distance that its stepped portions 86, 88 and 90 come to rest within the workpiece bores E, F and G respectively in the portions or partitions A, B and C respectively of the workpiece W. By rotating the index ring 172 manually so that the detent ball 192 enters the detent notch 198 (FIGS. 1 and 5), the operator activates the third probe 124 and de-activates the second and first probes 126 and 124 in the manner described above. The operator then rotates the fluted handle 32 with one hand while he holds the dial indicator holder handle boss 72 stationary with the other hand, so as to hold the dial indicator 54 temporarily stationary. As the third probe 124 traces out an arcuate path within the workpiece bore G, any departure from proper location or concentricity thereof relatively to the cylindrical pilot surface 92 and consequently the bearing bushing surface 94 in the master fixture 100 is immediately indicated by the swinging of the dial indicator needle 64 to and fro relatively to the graduated scale 60 thereof and the amount indicated by the particular graduation 62 to which the tip of the needle 64 swings from its zero graduation.

Having checked the outermost workpiece bore G for location or concentricity relatively to the master fixture bore 94, the operator shifts the index ring 172 to the next detent notch 198 or 200 which the ball detent 192 enters, and repeats the foregoing procedure with the second probe 126 and the first probe 124 individually while de-activating the other two probes at that instant, so as to successively measure the relative location or concentricity of the workpiece bores G and E respectively with relation to the master fixture reference or pilot bore 94.

It will be understood that the ranges of bore diameters measurable by this instrument may be increased by the use of any of the several adapters disclosed and claimed in my co-pending application Ser. No. 207,330 filed December 13, 1971 for Range-Extension Device for Double-Probe Hole-Location and Concentricity Gauge in the manner therein set forth.

I claim:

1. A multi-probe hole-location or concentricity-measuring spindle, adapted to be coupled to a dial indicator holder in operative engagement with the operating plunger of a conventional dial indicator mounted in said holder for measuring the relative locations or concentricities of first, second and third holes in a workpiece relatively to a master reference surface, said spindle comprising an elongated probe-supporting structure having a pilot surface thereon adapted to snugly but rotatably fit the master reference surface and having a longitudinal bore therethrough, said probe-supporting structure having a rearward coupling portion adapted to be coupled to the dial indicator holder and having a forward portion containing axially-spaced first, second and third probe bores disposed transversely to said longitudinal bore and communicating therewith, first, second and third workpiece hole probes reciprocably mounted in said first, second and third probe bores, an elongated motion-transmitting member rotatably and reciprocably mounted in said longitudinal bore with a forward portion extending into said transverse bores and with a rearward portion adapted to be operatively connected to the dial indicator plunger, first, second and third transverse-to-longitudinal motion-converting devices disposed respectively between said first, second and third probes and said motion-transmitting member, said motion-converting devices being responsive to the rotation of said motion-transmitting member for moving one of said devices into a temporarily operative position while moving the other two of said devices into temporarily inoperative positions, and means for selectively rotating said motion-converting devices into their respective operative and inoperative positions, each of said motion-converting devices including a cam on said motion-transmitting member and a contact portion on its respective probe engageable with said cam in a predetermined position of rotation of said motion-transmitting member, said selectively-rotating means including a probe locator carrier fixedly secured to said probe-supporting structure for rotation unitarily therewith and having circumferentially-spaced first, second and third probe locators thereon, and also including a probe selector rotatably mounted on said probe-supporting structure and rotatingly connected to said motion-transmitting member, said probe selector having a locator-engaging element movable therewith into successive positions of engagement with said probe locators as first, second and third cams come successively into engagement with the contact portions of said probes.

2. A multi-probe hole-location or concentricity-measuring spindle, according to claim 1, wherein said carrier includes three recesses disposed at equal radial distances away from the axis of rotation of said probe-supporting structure and spaced circumferentially apart from one another at locations corresponding to the positions of engagement of said first, second and third cams with the contact portions of their respective probes, and wherein said locator-engaging element includes a resiliently-urged member yieldingly engageable successively with said recesses in response to rotation of said probe selector.

* * * * *